United States Patent [19]

Geisel

[11] 4,034,947

[45] July 12, 1977

[54] ROTATING SEAT DEVICE

[76] Inventor: Anthony Geisel, 5219 N. Spaulding Ave., Chicago, Ill. 60625

[21] Appl. No.: 598,780

[22] Filed: July 24, 1975

[51] Int. Cl.² .......................................... A47C 7/62
[52] U.S. Cl. ............................. 248/349; 108/139; 297/219; 297/240
[58] Field of Search .......... 297/219, 226, 240–242; 248/349, 425; 108/94, 103, 104, 139, 142; 16/171

[56] References Cited

U.S. PATENT DOCUMENTS

| 1,774,950 | 9/1930 | Squires | 248/425 |
| 2,502,847 | 4/1950 | Honigman | 248/349 X |
| 2,542,218 | 2/1951 | Toelstede | 248/425 |
| 3,185,523 | 5/1965 | Morrill, Jr. | 297/226 |
| 3,232,662 | 2/1966 | Graves | 297/240 X |
| 3,455,531 | 7/1969 | Baker | 248/349 |
| 3,611,953 | 10/1971 | Schottl | 108/139 |
| R24,805 | 3/1960 | Morrill, Jr. | 297/226 |

FOREIGN PATENT DOCUMENTS

| 376,301 | 7/1932 | United Kingdom | 108/139 |
| 814,613 | 6/1959 | United Kingdom | 248/349 |

Primary Examiner—Roy D. Frazier
Assistant Examiner—William E. Lyddane
Attorney, Agent, or Firm—Neuman, Williams, Anderson & Olson

[57] ABSTRACT

A rotating seat device for aiding rotational motion relative to a fixed seat is provided having flat disc-shaped members with smooth contacting inner surfaces and means for interconnecting the members and permitting relative rotational movement between the members while they remain in substantial registered relation.

1 Claim, 6 Drawing Figures

ROTATING SEAT DEVICE

BACKGROUND OF THE INVENTION

This invention relates in general to a rotatable seat device which facilitates relative rotational movement of the occupant, while disposed within a non-rotating seat. Such rotational movements are frequently encountered when one is performing routine tasks while occupying a fixed stool or chair and are also encountered when entering or leaving vehicles. Normally, an occupant encounters substantial frictional forces when rotating, particularly while sitting upon a fixed upholstered seat cushion behind the wheel of an automobile, with the result that excessive wear on the occupant's clothes and the seat's upholstery occurs.

In the past, attempts made to overcome this problem have typically involved building an entire seat for rotation as a unit. Of necessity, this approach to solving the problem utilizes expensive bearings and associated apparatus, and renders conversion of an existing fixed seat an impractical and costly operation. Another attempt at designing an attachable seat device is exemplified in U.S. Pat. No. 2,811,199 which describes an automobile seat covered with slick material so an occupant can slide across the seat on a pivoted seat pad. Such a system, however, responds to lateral forces resulting from the operation of the car and, additionally, the occupant is exposed to a large sheet of slick material which is not only uncomfortable but is cumbersome to use and may interfere with the attachability feature of the device.

SUMMARY OF THE INVENTION

It is, therefore, a primary object of this invention to provide a seat device which is not vulnerable to lateral forces.

It is a further object of the present invention to provide a seat device which is comfortable to the occupant.

It is still a further object of the present invention to provide a device which is of inexpensive and simple construction.

Finally, it is an object of the present invention to provide a seat device which will minimize seat wear by constraining the rotational motion of the device to avoid abrasive contact with the seat surface during rotation.

Further and additional objects will appear from the description, accompanying drawings and appended claims.

In one exemplary embodiment of the invention there is provided a pair of pad members arranged in superposed coincident relation and positioned upon the exposed surface of a fixed seat. The pad members are interconnected by fastening means so that the uppermost pad member may be rotated relative to the lowermost pad member upon rotational movement of the occupant of the seat. The lower surface of the lower pad may have a roughened surface which frictionally engages the seat covering, thereby enabling the interconnected pad members to be merely placed as an entity upon a seat at a desired location. In an automobile, for example, the lower pad member would frictionally engaged the seat cushion upholstery. The device, when in place, may be sat upon and will aid ingress and egress of the passenger or driver relative to the automobile seat.

BRIEF DESCRIPTION OF THE DRAWINGS

Reference will now be made to the accompanying drawings in which:

Referring now to the drawings, FIG. 1 shows a preferred embodiment of the seat device 10 disposed upon a selected portion of an upholstered cushion 11 forming a part of a conventional automobile seat A. In this embodiment, two pad members 12 and 13 of like circular configuration are provided which are preferably formed of flexible material and are arranged in coincident, superposed, contacting relation. One or both of the contacting (or interior) surfaces 12a and 13a of the pad members may be coated with a suitable material having a low coefficient of friction. The size of the pad members is preferably such that a substantial portion of the buttock of the occupant of the seat will be in contact with the exposed upper surface 12b of the upper pad member 12. The under surface 13b of the lower pad member 13 should have a high coefficient of friction so that the device will remain in a selected position relative to the seat cushion 11. The pad members should be flexible enough so that they will conform, at least partially, to the contour of the seat cushion and, thus, provide greater confort for the occupant. Furthermore, the pad member material may be opaque or translucent and of any desirable color so as to match or esthetically complement the upholstery color, or it may be of a transparent material thereby making the appearance of the device less noticeable. The pad members 12 and 13 in the FIG. 1 embodiment are interconnected to one another at their centers by a suitable fastener 14, for example, a snap fastener as shown in FIg. 2. Other fasteners such as a rivet-washer combination may be used for such purpose.

Figure 1:
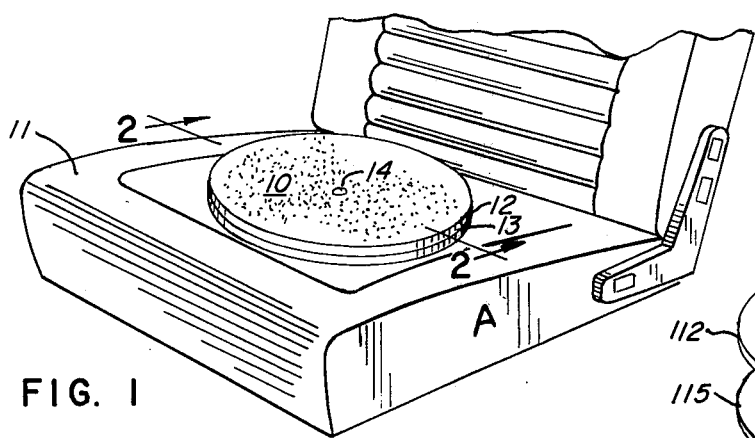
FIG. 1 is a fragmentary perspective view of one form of the improved device shown positioned upon an automobile seat.

The pad members are provided with central openings 12c and 13c which are disposed in aligned relation. The exposed side of each opening is preferably countersunk so as to accommodate the exposed ends of the fastener components 14a and b when the latter are in assembled relation.

By constraining the motion of the pad members to rotation about their centers and shaping the upper pad member 12 to fit within the periphery of the lower or base member 13, undesirable relative lateral motion of the pad members is eliminated and seat wear outside of the numbers is minimized.

Utilizing a snap fastener for interconnecting the pad members permits ready interchange or substitution of the pad members when desired. For example, during certain times of the year, the upper pad member 12 may be of a foraminous material which would provide better ventilation and more comfort for the occupant.

To render the lower pad member 13 non-sliding relative to the seat cushion 11, the undersurface 13b may be coated with a rubber-like material.

Figure 3:
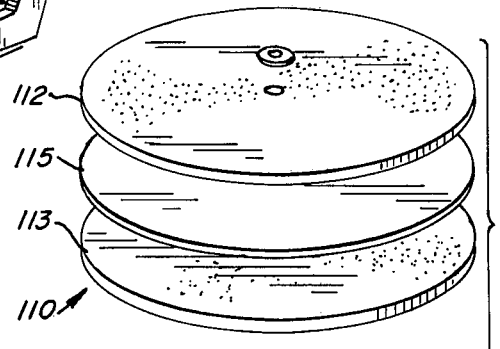
FIG. 3 is an exploded, perspective view of a second form of the improved device.
Figure 2:
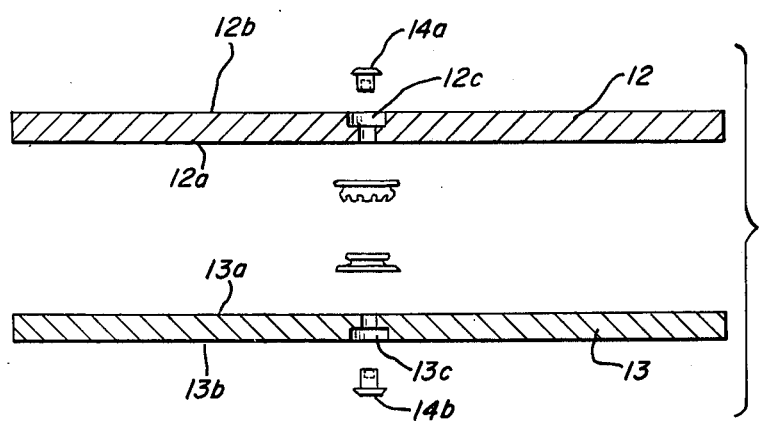
FIG. 2 is an exploded, sectional view taken along line 2—2 of FIG. 1.

Referring now to FIG. 3, a second embodiment of the device 110 is shown wherein a third member 115 is interposed the upper and lower pad members 112 and 113. Third member 115 is preferably formed of a thin pliable sheet of slick plastic material of the same configuration as members 112 and 113. Member 115 is provided with a central opening to accommodate the shank of the fastener 114. In lieu of the member 115 being pliable, it may be relatively stiff, if desired, thereby providing added support for the device.

Figure 4:
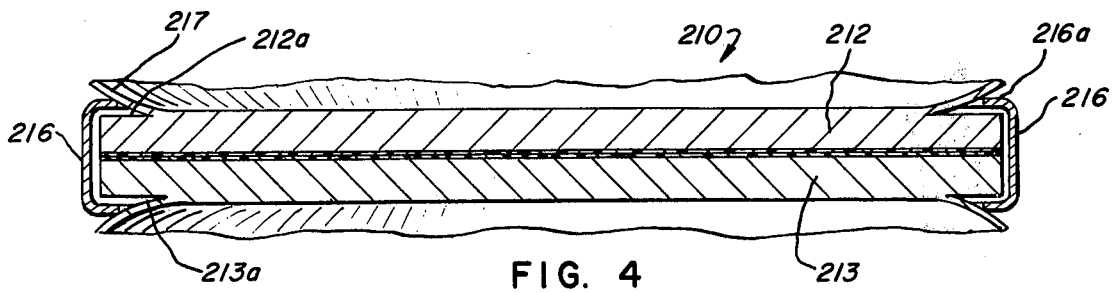
FIG. 4 is a central, vertical sectional view of a third form of the improved device.
Figure 5:
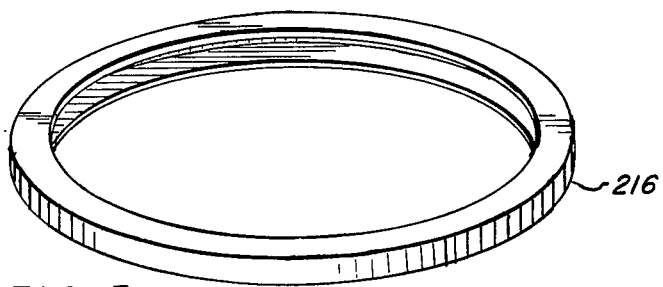
FIG. 5 is a perspective view of a component of the device of FIG. 4.

A third embodiment of the device 210 is shown in FIGS. 4 and 5 wherein a thin ring-like element 216 is substituted for the fasteners 14 or 114 illustrated in the other embodiments. Device 210 includes a pair of superposed pad members 212 and 213, each of which has a configuration similar to that of pad members 12 and 13. The ring-like element 216 encompasses the peripheries of members 212 and 213 and serves to retain the members in concentric superposed rotatable relation. Element 216 is substantially channel-shaped in cross-section, as seen in FIG. 4. To prevent the inwardly facing edges 216a of the element from causing discomfort to the occupant or accidently causing the clothes of the occupant being caught and torn by the element, an annular flap 217 may be provided which is carried on the exposed surface of the pad member 212 and overlies the edges 216a of the element. The inwardly extending edges 216a of the element 216 engage marginal portions of the upper and lower surfaces 212a and 213a of the pad members so as to enable the upper pad member 212 to readily rotate relative to member 213 when the device 210 is engaged by the occupant of the seat.

While the inwardly facing edges 216a of element 216 are shown in FIG. 4 as protruding beyond the upper and lower surfaces of the pad members 212 and 213, the marginal portions of the surfaces may be recessed an amount equal to the thickness of the element edges. The pad members 212 and 213 are preferably formed of relatively stiff material particularly in the area of the marginal portions.

Figure 6:
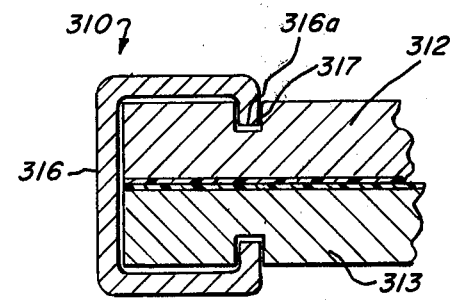
FIG. 6 is an enlarged fragmentary, sectional view of a fourth embodiment of the improved device similar to that shown in FIG. 4.

A fourth embodiment of the device 310 is shown in FIG. 6, and is similar in structure to device 210 except that an annular groove 317 is formed in the exposed marginal portions of pad members 312 and 313. The grooves are adapted to slidably receive an offset edge 316a of the ring-like element 316.

Thus it will be seen that an improved seat device is provided which is of simple and inexpensive construction; is capable of being utilized with a variety of types of fixed seats; reduces the wear of the seat covering and clothing of the occupant; does not require straps, ties, etc., in order to attach the device to the fixed seat; and the pad members may be readily assembled and disassembled so that various types of pad members may be substituted when desired.

I claim:

1. A device adapted to be removably positioned on a supporting seat for facilitating rotational movement of a seated body relative to the seat, said device comprising flexible disc-shape first and second members arranged in superposed relation and movable relative to one another about a substantially central transverse axis; flexible means intermediate said members for reducing friction therebetween; and an annular retainer element encompassing said first and second member, said element having flange portions extending inwardly towards said transverse axis and engaging surface portions of said first and second members, said flange portions being at least partially concealed by said first and second members.

* * * * *

UNITED STATES PATENT AND TRADEMARK OFFICE
CERTIFICATE OF CORRECTION

PATENT NO. : 4,034,947
DATED : July 12, 1977
INVENTOR(S) : Anthony Geisel

It is certified that error appears in the above-identified patent and that said Letters Patent are hereby corrected as shown below:

Col. 2, line 62 - "numbers" should be --members--

Col. 4, claim 1, line 30 - "flexible" should be --pliable--

Signed and Sealed this

Fourth Day of October 1977

[SEAL]

Attest:

RUTH C. MASON
Attesting Officer

LUTRELLE F. PARKER
Acting Commissioner of Patents and Trademarks